United States Patent

Draskovits et al.

Patent Number: 5,466,135
Date of Patent: Nov. 14, 1995

[54] ROTARY VANE-CELL PUMP

[75] Inventors: Günter Draskovits; Johann Merz, both of Schwäbisch Gmünd, Germany

[73] Assignee: ZF Friedrichshafen AG, Germany

[21] Appl. No.: 256,954

[22] PCT Filed: Mar. 20, 1993

[86] PCT No.: PCT/EP93/00679

§ 371 Date: Jul. 27, 1994

§ 102(e) Date: Jul. 27, 1994

[87] PCT Pub. No.: WO93/19297

PCT Pub. Date: Sep. 30, 1993

[30] Foreign Application Priority Data

Mar. 26, 1992 [DE] Germany .......... 42 09 840.8

[51] Int. Cl.$^6$ .................................. F04C 2/00
[52] U.S. Cl. .............. 418/268; 418/15; 137/514; 137/512.4; 137/856
[58] Field of Search ............... 418/15, 183, 259, 418/267, 268, 269; 137/514, 514.5, 512.4, 856

[56] References Cited

U.S. PATENT DOCUMENTS

| | | | |
|---|---|---|---|
| 1,913,758 | 6/1933 | Hapkins | 418/266 |
| 2,771,860 | 11/1956 | Falk | 418/268 |
| 3,054,357 | 9/1962 | McGill | 418/269 |
| 3,939,867 | 2/1976 | Lundvik et al. | 137/514 |
| 4,516,918 | 5/1985 | Drutchas et al. | 418/15 |
| 4,913,636 | 4/1990 | Niemiec | 418/268 |

FOREIGN PATENT DOCUMENTS

| | | |
|---|---|---|
| 0399387 | 11/1990 | European Pat. Off. . |
| 3005656 | 8/1981 | Germany . |
| 3319000 | 12/1983 | Germany . |
| 4110734 | 10/1991 | Germany . |
| 2150641 | 7/1985 | United Kingdom . |

Primary Examiner—Richard A. Bertsch
Assistant Examiner—Charles G. Freay
Attorney, Agent, or Firm—Davis, Bujold & Streck

[57] ABSTRACT

The invention concerns a suction-controlled vane-cell pump whose pumped flow does not increase further above a determined speed but remains practically constant. Radially movable vanes (4), arranged in a rotor (2), form working chambers (12). Between the vanes (4) the rotor (2) has control slots (21) which cooperate with several outlets (22 or 22A) of a front plate (5) located in a pressure zone. The control slots (21) and the outlets (22 or 22A) are dimensioned so that a reflux of oil under pressure can be avoided from a higher-pressure working chamber (12) into a lower-pressure working chamber. The outlets (22 and 22A) are closed by a valve (24) with movable tongues (25, 25A). During the opening stroke, the tongues (25, 25A) rest on a supporting body (26). Suction openings (13 and 13A) communicate with a suction chamber (14) through throttle bores (31, 31A) in order to limit the suction current. Wear due to cavitation can be avoided by the invention. The pump has a low running noise level and can be cost-effectively produced with a small volume.

2 Claims, 4 Drawing Sheets

2

ROTARY VANE-CELL PUMP

FIELD OF THE INVENTION

The invention concerns a vane-cell pump having a cam ring supported in the housing where a rotor fastened to a shaft rotates with vanes radially movable in slots. Between the vanes are working chambers closed by lateral front plates. One of the front plates has suction and pressure zones for feeding and removing oil. A valve device is situated in one of the front plates which prevents a reflux of oil already delivered when the working chambers are partially filled.

BACKGROUND OF THE INVENTION

A vane-cell pump having the features mentioned has already been disclosed in DE 41 10 734 A1. In this pump, the rotor has a bore system consisting of a number of interconnected radial and axial bores attached to the working chambers. The axial bores of said bore system are covered by an outlet valve designed as a check disc. The check disc, coordinated with all of the working chambers, prevents previously pressurized oil from flowing back into the partly filled working chambers. It is possible, in this manner, to prevent damage caused by cavitation. The already known vane-cell pump works with the advantage of so-called suction control, that is, the pump sucks only the amount of oil needed at the time. Accordingly, an excessive amount of oil is not pressurized which is subsequently sent back to the suction zone via a flow-control valve. Input can be saved in this manner. The check disc, closing the axial bores in the rotor, is compressed by a pressure element supported in one front plate, generating undesired friction between the rotor and the check disc. Because of the radial and axial bores passing into each other at right angles, the pump has, in addition, relatively high inner drag.

The problem on which the invention is based is to find a suction-controlled vane-cell pump as free of erosion as possible and having low inner drag and smooth operation. Another requirement is to accommodate the parts required for suction control of the pump in a narrow space so that the body of the pump can be built small and yet capable of reaching a high reliability of operation.

SUMMARY OF THE INVENTION

According to the main feature, the rotor has control slots between the vanes which, in the area of the pressure zone, cooperate with several outlets arranged in tandem in the front plate. The valve device is fastened on the rear side of the front plate and controls the outlets. The control slots are dimensioned, in relation to the outlets, in a manner such that no reflux of delivered oil from a working chamber of higher pressure into a working chamber of lower pressure can occur. The valve device ensures that the oil present in the constantly narrowing working chambers be prestressed and ejected only when the oil volume corresponds to the existing size of the chamber. The above mentioned features provide a suction-controlled pump of low running noise where cavitation damage can be reliably prevented.

According to one feature, the valve device is designed as a tongued valve wherein a supporting body fastened on the front plate limits the opening stroke of the front plate. The supporting body simultaneously serves to fix the valve. The valve is designed as one piece for both pressure zones, the tongues lying homologously with respect to each other. The valve device consists of only two separate parts which can be quickly assembled. It is also advantageous, for smooth running, if the supporting body has oil pockets, in the area of the tongues, for damping the opening stroke.

According to another feature, the diametrically opposite suction zones are each connected with an annular suction chamber via a respective throttle bore. Said throttle bores limit the flow of sucked oil so that a further increase of the flow rate, above a specific speed of the pump, can not take place. The annular suction chamber connected with the suction zones can, in one embodiment, communicate with a suction connection, but also with only one throttle bore.

In another feature, the pressure-conveying outlets discharge behind the valve device in a damping chamber. This feature reduces the pressure pulsations and possible noise caused thereby.

According to one feature, it is further provided that the outlets are furnished with radial grooves for enlarging their exhaust aperture. This feature causes the exhaust pressure to disperse over a large surface of the individual tongues of the valve device so that the latter opens softly without a substantial increase of pressure.

BRIEF DESCRIPTION OF THE DRAWINGS

Two embodiments of the invention are explained in detail herebelow with reference to the drawings. In the drawings.

DETAILED DESCRIPTION OF THE PREFERRED EMBODIMENT

Figure 1:
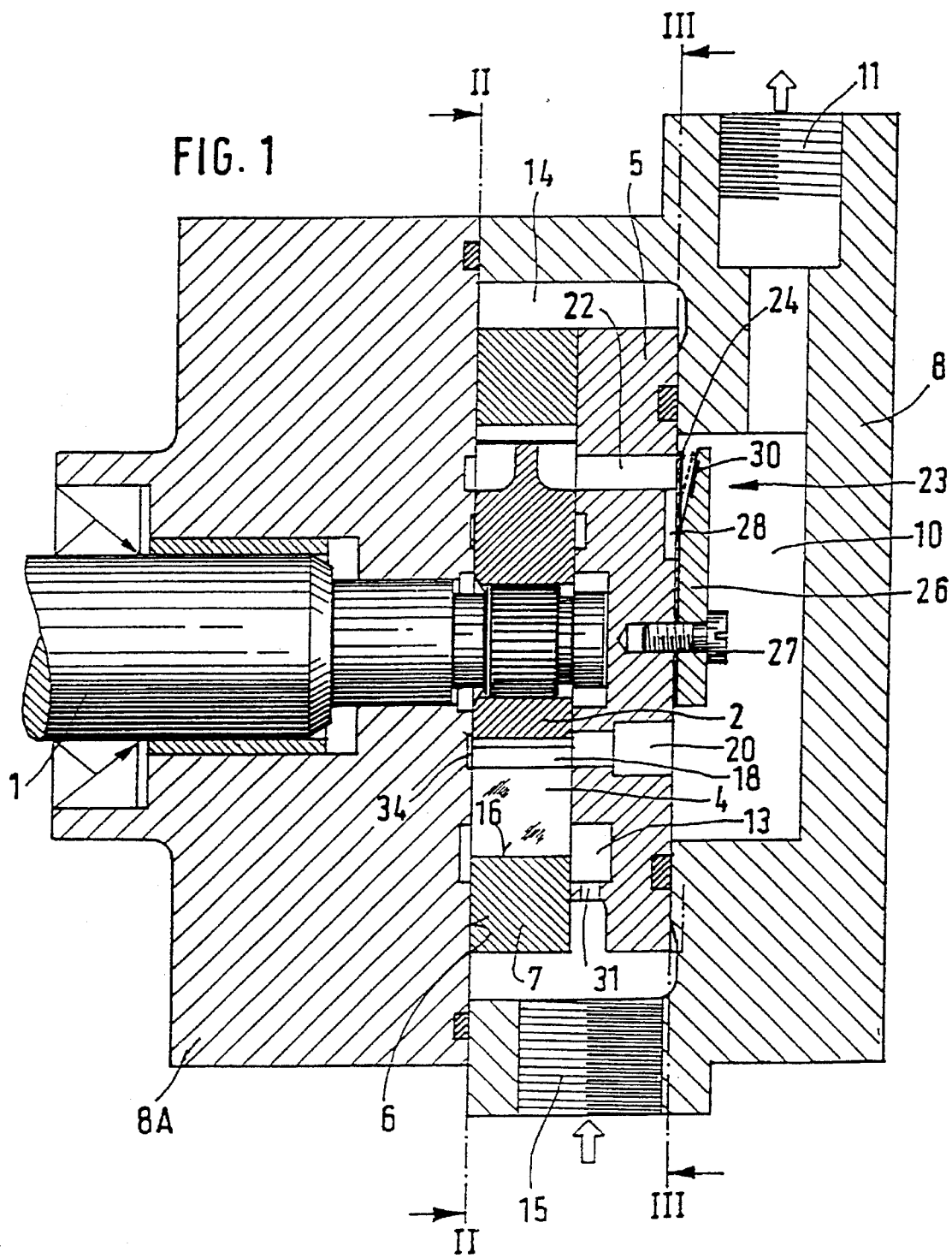
FIG. 1 is a longitudinal section through a vane-cell pump along line I—I in FIG. 2.

The main structural parts of the vane-cell pump correspond to the generally known construction so that the specification is confined to the parts essential for an understanding. The double-stroke pump of FIGS. 1 and 2 supports a rotor 2 which is non-rotatable on an input shaft 1 and into the slots 3 of which are passed radially sliding vanes 4. The rotor 2 rotates together with the vanes between a front and a rear front plate respectively 5 and 6. The vanes 4 slide, on the external diameters thereof, in a cam ring 7. For the purpose of play compensation, the front plate 5 is loosely placed between a housing part 8 and the pump set consisting of the rotor 2, the vanes 4 and the cam ring 7. The rear front plate 6 is designed as one piece with the housing part 8A. A pressure chamber 10, which communicates with an outlet 11 leading to the customer, is behind the front plate 5. The vanes 4 form working chambers 12 therebetween which are connected, via suction openings 13 and 13A and an annular suction chamber 14, with a suction connection 15. For better sealing of the vanes 4 on a stroke curve 16 of the cam ring 7, the working pressure is guided into the inner vane chambers 18 via bores 20, 20A, partly annular ducts 17, 17A and 19, 19A (FIG. 2) and via an annular groove 34 (FIG. 1).

Figure 2:
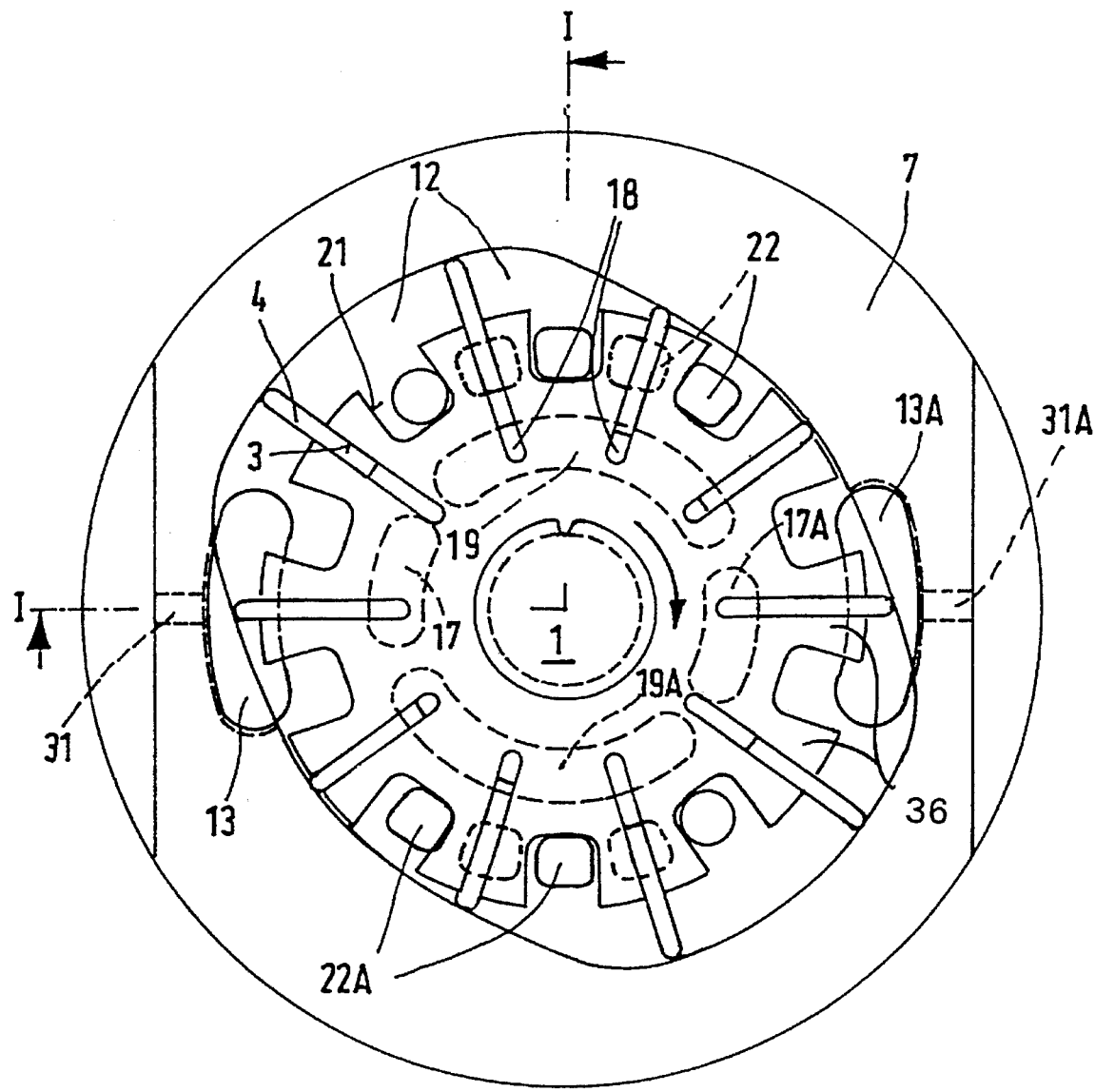
FIG. 2 is an enlarged view of the pump set, along line II—II in FIG. 1, with the housing omitted.
Figure 3:
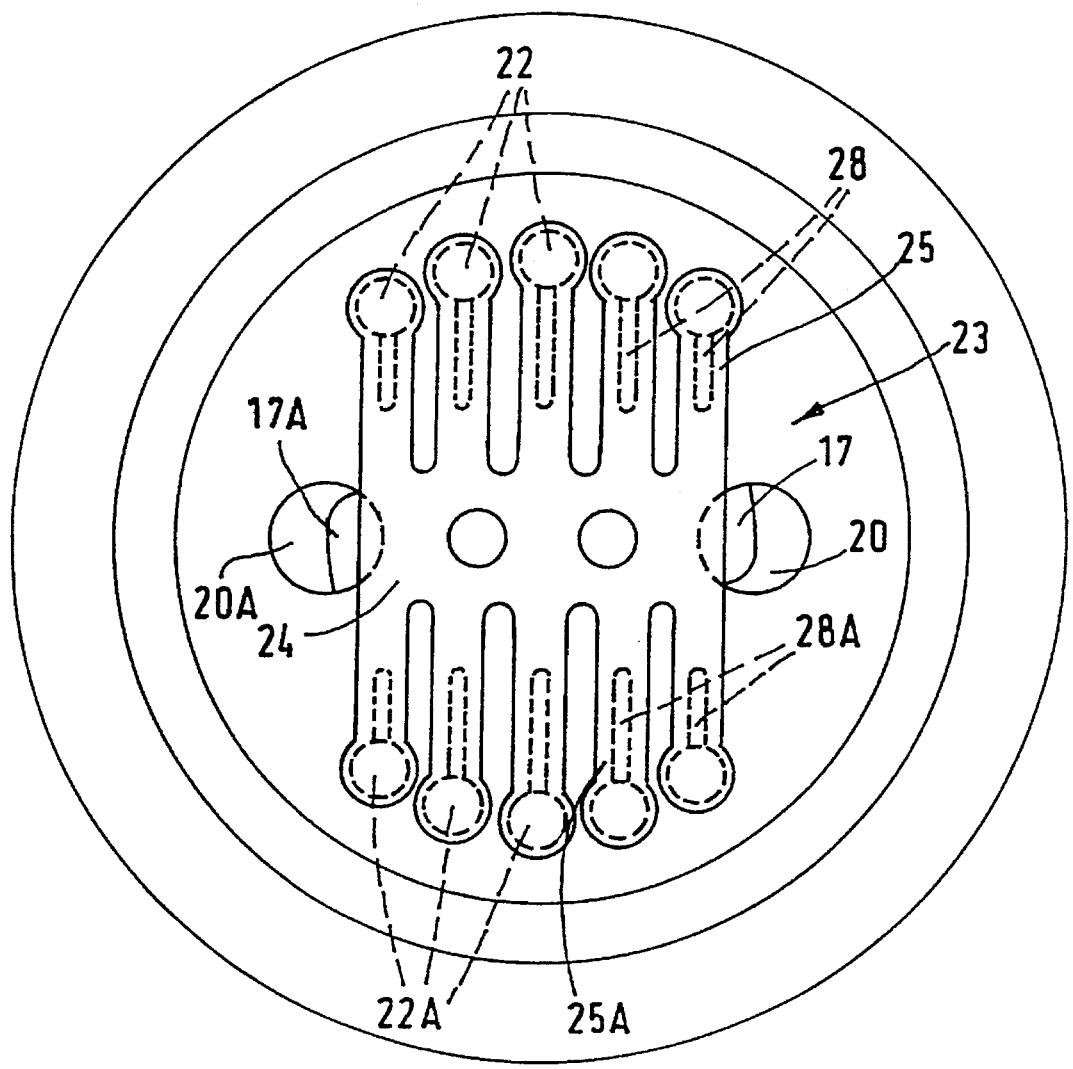
FIG. 3 is an enlarged view of the valve device, along line III—III in FIG. 1, also with the housing omitted.

According to the invention, the rotor 2 has control slots 21 that define teeth 36 therebetween that support the vanes 4 between the vanes 4 that define teeth 36 therebetween that support the vanes 4. Besides, several outlets 22 and 22A arranged in tandem on a circle segment are provided in the front plate 5 in the area of the pressure zone. The control slots 21 and the outlets are dimensioned in such a manner that the circumferential distance across each tooth 36 is larger than the width of the outlets 22 and 22A. In this manner, when a vane 4, supported by a tooth 36, as passing over an outlet 22 or 22A, the outlet 22 or 22A is completely covered and sealed by the tooth 36 as shown in FIG. 2. Thus the outlet 22, 22A can only communicate with a single working chamber 12 at a time and there can be no reflux of pressurized oil from one working chamber into a consecutive working chamber 12 with a lower pressure head. Cavitation can be prevented thereby. The outlets 22 and 22A are closed by a valve device 23 (FIG. 3) which is comprised of a tongued valve 24 with homologously situated resiliently movable tongues 25 and 25A and a supporting body 26 (FIG. 1). The valve 24, made of thin plate steel, and the supporting body 26 can both be fastened by screws 27 to the front plate 5. It can be seen in FIGS. 1 and 3 that the outlets 22 and 22A are provided with radial grooves 28 and 28A for enlarging their exhaust aperture. The tongues 22 and 22A thereby can be superimposed over a large surface during the opening. The supporting body 26, which can be seen in partial section, has recesses therein, opposite the outlets 22 and 22A, that define oil pockets 30, for hydraulically damping the opening movement, of the tongues 25 and 25A and cushion their impact upon the supporting body 26 as shown by dotted lines in FIG. 1. It also belongs to the invention that throttle bores 31 and 31A are provided, between the annular suction chamber 14 and the suction openings 13 and 13A, which limit the suction current by the pump speed.

The rotor 2 rotates in direction of the arrow in FIG. 2. The oil flowing in the working chambers 12 from the suction openings 13 and 13A is compressed by the vanes in accordance with the stroke curve 16 of the cam ring 7 and, depending on the volumetric efficiency of the working chambers 12, reaches the pressure chamber 10 via the outlets 22 and 22A situated in the front and in the rear area of the pressure zone and the valve device 23. By virtue of the lifting pressure, the tongues 25 and 25A, at the same time, rise from the outlets 22 and 22A and briefly abut, in tandem, against the supporting body 26. The oil finally flows from the pressure chamber 10 to the customer via the outlet 11.

Figure 4:
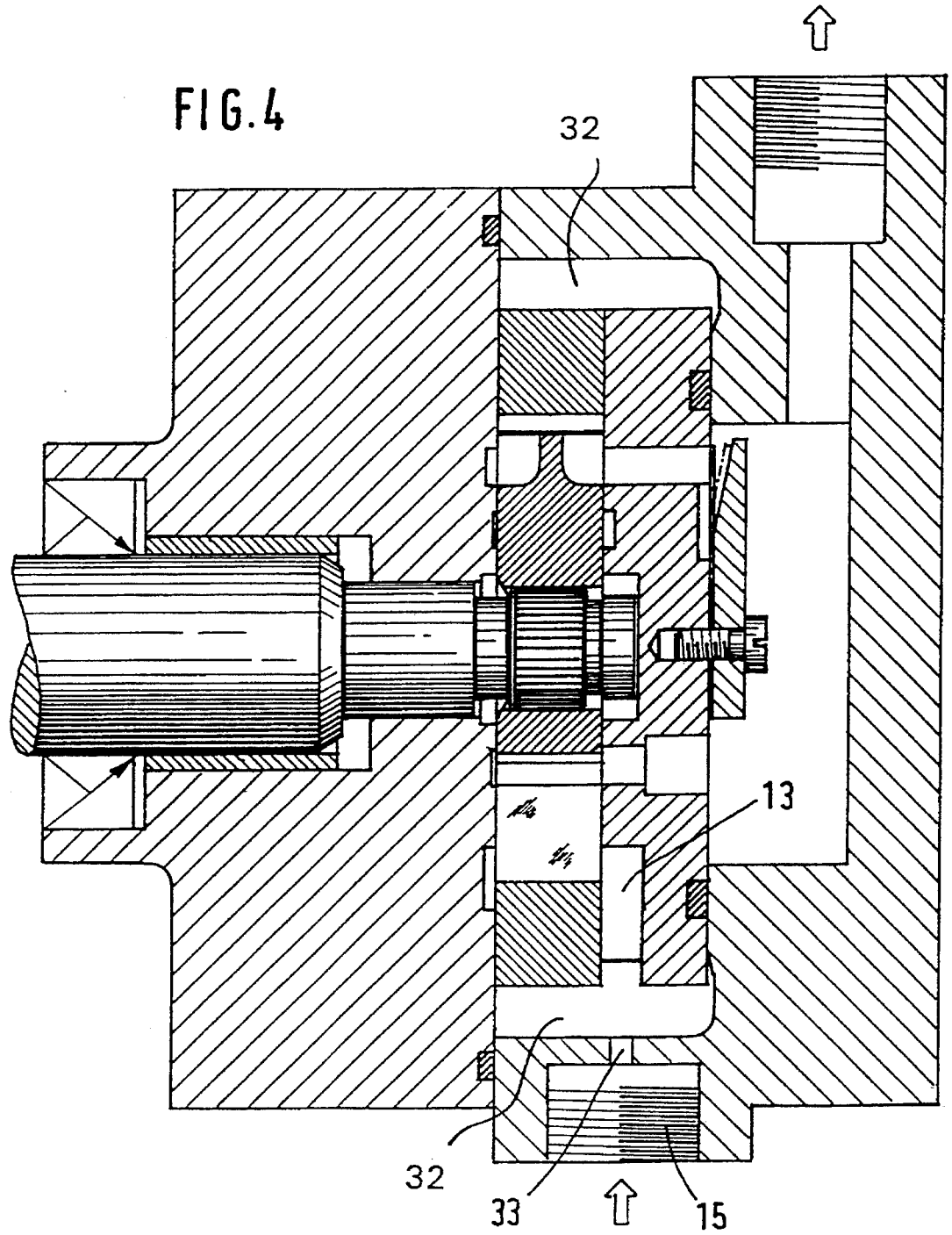
FIG. 4 is a partial longitudinal section of another embodiment.

The embodiment in FIG. 4 differs from FIG. 1 by the fact that the annular suction chamber 32, connected with the suction openings 13 and 13A, communicates with the suction connection 15 via a single throttle bore 33. Therefore, the throttle bore 33 limits the influx for both suction openings 13 and 13A. It is obviously also possible, instead of the described throttle bores 31, 31A, or 33, to use an electromagnetically actuated proportional valve in the suction connection 15 which, depending on the running speed, for instance, can adjust a desired suction current (see DE-OS 41 10 734 A1).

| Reference numerals | | | |
|---|---|---|---|
| 1 | input shaft | 18 | inner vane spaces |
| 2 | rotor | 19,19A | partially annular ducts |
| 3 | slots | | |
| 4 | vanes | 20,20A | bores |
| 5 | front plate | 21 | control slots |
| 6 | front plate | 22,22A | outlets |
| 7 | cam ring | 23 | valve device |
| 8,8A | housing part | 24 | valve |
| 9 | — | 25,25A | tongues |
| 10 | pressure space | 26 | supporting body |
| 11 | outlet | 27 | screws |
| 12 | working chambers | 28,28A | grooves |
| 13,13A | suction openings | 29 | — |

-continued

| Reference numerals | | | |
|---|---|---|---|
| 14 | suction chamber | 30 | oil pockets |
| 15 | suction connection | 31,31A | throttle bores |
| 16 | stroke curve | 32 | suction chamber |
| 17,17A | partially annular ducts | 33 | throttle bore |
| | | 34 | annular duct |

We claim:

1. A rotary pump comprising:

a housing (8, 8A) having front and back plates (5 and 6) defining an inner chamber therebetween;

a cam ring (7) stationarily supported in said inner chamber (8, 8A) between said front and back plates (5 and 6), said cam ring (7) having an inner peripheral cam surface alternately defining pressure and suction zones in said inner chamber;

an input shaft (1) passing through said back plate (6) and having a rotor (2) non-rotatably fixed thereto, said rotor (2) being supported in said housing (8, 8A) between said front and back plates (5 and 6) and inside said cam ring (7), said rotor having radially extending vane slots (3) in an outer peripheral surface thereof with vanes (4) being radially slidably mounted in said vane slots (3), said vanes (4) defining a plurality of working chambers between each pair of adjacent vanes (4) and outer radial edges of said vanes slidably contacting said cam surface of said cam ring (7);

an inlet opening 13 in said front plate (5), said inlet opening being located in said suction zone for communicating said working chambers (12) with an inlet port, when said working chambers (12) are in said suction zone, and feeding fluid from said inlet port into said working chambers (12);

a plurality of outlet openings (22 and 22A) in said front plate, said outlet openings being located in said pressure zone for communicating said working chambers (12) with an outlet port, when said working chambers are in said pressure zone, and delivering pressurized fluid from said working chambers (12) into said outlet port;

a plurality of feed passages (20) in said front plate (5) communicating said outlet port with an inner radial portion of each said vane slot (3), for pressurizing said inner portion of said vane slots (3) and urging said vanes (4) radially outward and maintaining said vanes (4) in contact with said cam surface; wherein a valve disc (23), having a plurality of resilient tongues (25, 25A), is mounted to said front plate on a side of said front plate that is remote from said rotor (2), said tongues resiliently seal each of said outlet openings for preventing reflux of pressurized fluid delivered to said outlet port back into said working chambers (12); and a plurality of control slots (21) in an outer peripheral surface of said rotor that define a plurality of teeth (36) around the circumference of said rotor (2), each said tooth contains one of said vane slots and supports one of said vanes (4), and a width of each said tooth (36) is wider than each said outlet opening (22, 22A), whereby each said outlet opening can only communicate with one of said-working chambers (12) at a time.

2. A rotary pump according to claim 1, further comprising a supporting body (26) that is mounted to said front plate (5), on said side of said front plate that is remote from said rotor (2) with said valve disc (23) sandwiched between said front plate (5) and said supporting body (26), said supporting body (26) has a support surface that limits an opening motion of said tongues (25, 25A), and said support surface has a plurality recesses therein, one opposite each said tongue, for hydraulically damping the opening motion of said tongues (25, 25A).

* * * * *